March 31, 1959 — A. G. HOLLMANN — 2,879,791
HYDRAULIC SYSTEM SAFETY VALVE
Filed Sept. 13, 1956
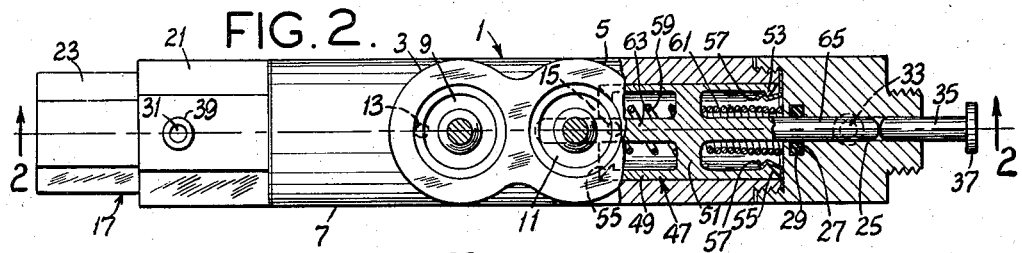
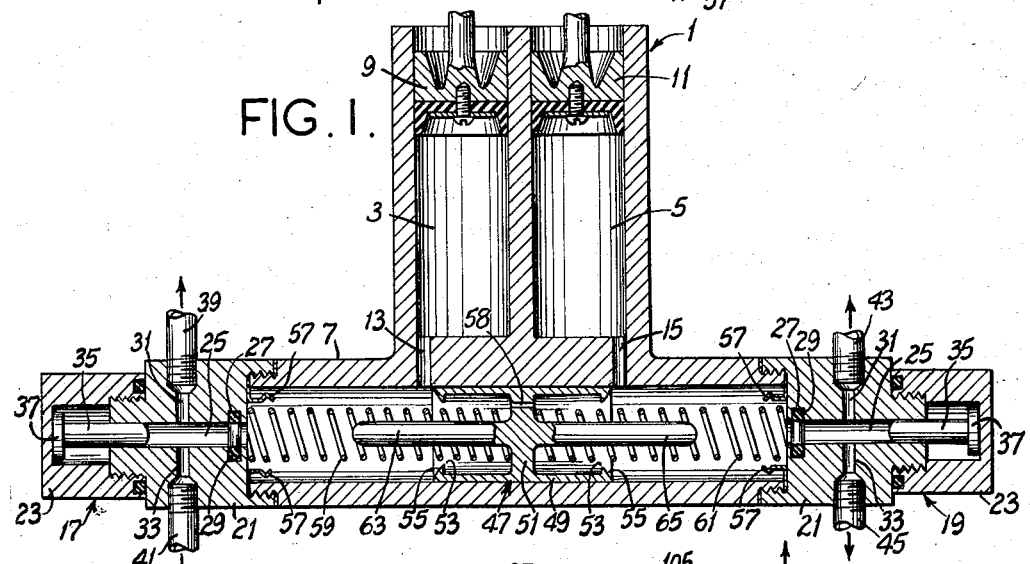
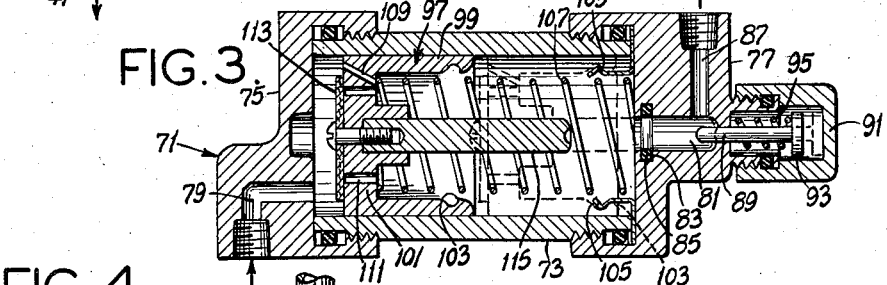
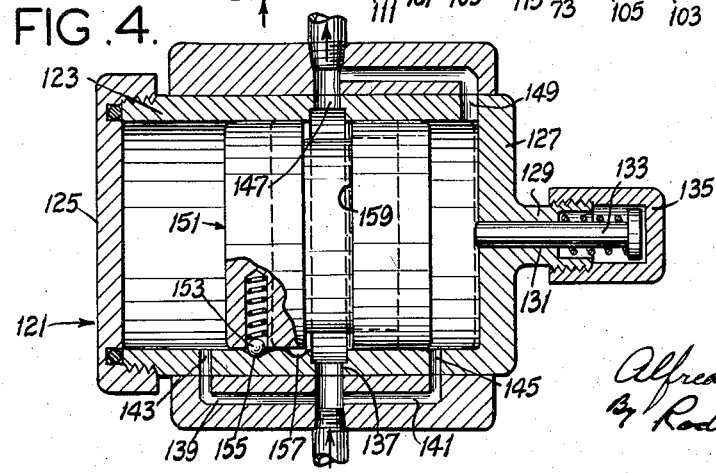
Inventor
Alfred G. Hollmann
By Rodney Bedell
atty.

United States Patent Office 2,879,791
Patented Mar. 31, 1959

2,879,791

HYDRAULIC SYSTEM SAFETY VALVE

Alfred G. Hollmann, St. Louis, Mo.

Application September 13, 1956, Serial No. 609,731

3 Claims. (Cl. 137—460)

This invention relates to valves, and more particularly to safety valves for hydraulic brake systems.

Among the several objects of the invention may be noted the provision of improved safety valves particularly for use in hydraulic brake systems adapted to prevent the complete loss of brake fluid in the event of a leak; the provision of valves of this class adapted to allow for transmission of pressure from a master cylinder of the brake system to one or more hydraulic brake cylinders, and adapted positively to close in response to pressure differential on opposite sides of the valve such as occurs upon a leak in a brake cylinder or in a brake line leading from the valve to the brake cylinder; the provision of a valve of this class which, upon closing, is positively latched in closed position, and wherein means is provided for readily releasing the valve from its closed position after repairs have been completed; the provision of a valve construction associated with a pair of master cylinders which acts in the case of failure of one of the master cylinders to block off this master cylinder, while permitting operation of the other; and the provision of valves having the stated characteristics which are reliable in operation and of economical construction. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

Figure 1 is a view in cross section of a dual master cylinder unit including a valve means of this invention.

Figure 2 is a plan of Figure 1, with a cap removed, with parts broken away and shown in section, and illustrating a moved position of parts.

Figure 3 is a view in cross section of another embodiment of the invention for attachment in a line leading to a brake cylinder; and Figure 4 is a view in cross section of still another form of the valve of this invention for connection in a brake line.

Corresponding reference characters indicate corresponding parts throughout the several views of the drawings.

Referring to the drawings, Figures 1 and 2 show a dual master cylinder unit generally designated 1. This comprises a body formed to provide two master cylinders 3 and 5 extending parallel to one another side by side, and a valve cylinder 7 extending transversely across the master cylinders at one end thereof. The master cylinder 3 has a piston 9 therein, and the master cylinder 5 has a piston 11 therein. The master cylinder 3 is in communication with the valve cylinder 7 via a port 13, and the master cylinder 5 is in communication with the valve cylinder 7 via a port 15. Ports 13 and 15 extend laterally into the cylinder 7 and constitute axially spaced lateral inlets for the cylinder 7.

The ends of the valve cylinder 7 are closed by closure assemblies 17 and 19. These are of identical construction, each comprising a head 21 threaded on the respective end of the valve cylinder 7, and a closure in the form of a cap 23 removably threaded on the head 21. The head 21 has an axial outlet passage 25. The passage 25 is formed with an annular groove 27 in which is fitted a packing ring 29. Two ports 31 and 33 lead radially outward from passage 25. These ports 31 and 33 are located axially outward of packing ring 29. A rod 35 is slidable in the passage 25. This rod extends out into the cap 23, and has a button 37 at its outer end. The length of the rod 35 is such that when it is moved outward as far as permitted by cap, ports 31 and 33 are unblocked.

Lines 39 and 41 are shown connected into ports 31 and 33 in the head of assembly 17, and lines 43 and 45 are shown connected into the ports 31 and 33 of the head of assembly 19. Lines 39 and 41 may lead to the brake cylinders of the brakes for the front wheels of a vehicle, for example, and lines 43 and 45 may lead to the brake cylinders of the brakes for the rear wheels of the vehicle.

A piston generally designated 47 is reciprocable in the valve cylinder 7 from one end of the cylinder 7 to the other. The piston 47 has a cylindrical barrel 49 and a central transverse web 51. The barrel 49 has an inwardly directed flange 53 at each end. The end edges of the barrel are beveled as indicated at 55. The flange 53 at one end of the barrel is adapted for latching engagement with spring latch members 57 at one end of the valve cylinder 7, and the flange 53 at the other end of the barrel is adapted for latching engagement with similar spring latch members 57 at the other end of the valve cylinder. The web 51 has a bleed hole 58.

The width of the piston 47 (the length of its barrel portion 53) is less than the distance between the valve cylinder inlets 13 and 15 and greater than the distance from either inlet 13 or 15 to the respective end of cylinder 7. The piston is normally maintained in a central retracted position in cylinder 7 between the inlets 13 and 15, wherein both inlets are open to cylinder 7, by means comprising two coil compression springs 59 and 61 in cylinder 7 on opposite sides of the piston. These springs react from heads 21 against opposite sides of the web 51 of the piston. The piston has plungers 63 and 65 extending axially from opposite sides of the web 51 into the springs. These plungers are of such diameter as to be adapted for a sliding sealing fit in packing rings 29. Their length is such that when the piston is in its stated retracted position, their outer ends are spaced from the respective end of cylinder 7.

Operation of the construction shown in Figures 1 and 2 is as follows:

It will be understood that the cylinders 3 and 5, the cylinder 7 and lines 39, 41, 43 and 45 will be filled with brake fluid. Normally, the piston 47 occupies the central retracted position in cylinder 7 shown in Figure 1. Accordingly, upon a pressure stroke of the master cylinder pistons 9 and 11, pressure is transmitted through ports 13 and 15 to the cylinder 7 on opposite sides of the piston 47 and through passages 25, ports 31 and 33, and lines 39, 41, 43 and 45 to all four brake cylinders. This pressure being equal on opposite sides of the piston 47, this piston remains in its central retracted position.

A failure of master cylinder 5, either of lines 43 or 45, or either of the brake cylinders to which these lines lead results in development of lower pressure on the right side of piston 47 than on the left side of the piston 47. The bleed hole 58 in the piston 47 is small enough so that equalization of pressure on opposite sides of the piston cannot occur immediately. Accordingly, the piston 47 moves toward the right to the end position shown in Figure 2 and becomes latched in this position by engagement of the right-hand piston flange 53 with the spring latch members 57 at the right end of the cylinder. Upon the stated movement of the piston 47, plunger 65 enters and blocks the right-hand passage 25, and the piston 47 blocks the port 15. When the plunger 65 blocks passage 25, fluid that would be otherwise trapped to the right of piston 47 bleeds through the hole 58 to the left side of the piston.

Thus, in the case of failure of the master cylinder 5, this cylinder (but not cylinder 3) is sealed off by the piston 47. In the case of failure of either of lines 43 and 45 (or the brake cylinders to which they lead), both these lines (but not lines 39 and 41) are sealed off by the plunger 65 to prevent escape of fluid through the line or brake cylinder which has failed. The piston 47 and plunger 65 remain latched in their operative end position despite subsequent equalization of pressure on opposite sides of the piston. After repairs have been made, in order to release the piston 47 for return to its retracted position, the right-hand cap 23 is removed (see Figure 2) and the right-hand rod 35 pushed inward to push the plunger 65 and the piston 47 inward. Then the cap is replaced.

Similarly, a failure of master cylinder 3, either of lines 39 or 41, or either of the brake cylinders to which these lines lead, results in development of lower pressure on the left side of piston 47 than on the right side of the piston 47. Accordingly, the piston 47 moves toward the left to an end position at the left end of cylinder 7 and becomes latched in this position by engagement of the left-hand piston flange 53 with the spring latch members 57 at the left end of the cylinder. Upon the stated movement of the piston 47, plunger 63 enters and blocks the left-hand passage 25, and the piston 47 blocks the port 13. When the plunger 63 blocks this passage 25, fluid that would be otherwise trapped to the left of piston 47 bleeds through the hole 58 to the right side of the piston.

Thus, in the case of failure of the master cylinder 3, this cylinder (but not cylinder 5) is sealed off by the piston 47. In the case of failure of either of lines 39 and 41 (or the brake cylinders to which they lead) both these lines (but not lines 43 and 45) are sealed off by the plunger 63 to prevent escape of fluid through the line or brake cylinder which has failed. The piston 47 and plunger 63 remain latched in their operative end position despite subsequent equalization of pressure on opposite sides of the piston. After repairs have been made, in order to release the piston 47 for return to its retracted position, the left-hand cap 23 is removed and the left-hand rod 35 pushed inward to push the plunger 63 and the piston 47 inward. Then the cap is replaced.

Figure 3 shows a valve generally designated 71 for connection in a brake line leading from a master cylinder to a brake cylinder to prevent escape of fluid past the valve through the line in the event of a leak in the line or the brake cylinder. As illustrated, the valve 71 comprises a cylinder 73 having end heads 75 and 77. In the head 75 is an inlet 79 for entry of fluid from the master cylinder. Head 77 has an axial outlet passage 81. This passage 81 is formed with an annular groove 83 in which is fitted a packing ring 85. A port 87 leads radially outward from the passage 81. This port is located axially outward of the packing ring 85. A rod 89 is slidable in the passage 81. This rod extends out into a cap 91 removably threaded on the head 77. The cap has a button 93 at its outer end. A spring 95 is provided for biasing the rod in outward direction. A line leading from the master cylinder (not shown) may be connected into the inlet 79, and a line (not shown) may be connected into the outlet port 87 leading to a brake cylinder.

A piston generally designated 97 is reciprocable in the valve cylinder 73 from one end of the cylinder to the other. The piston 97 has a cylindrical barrel 99 and a transverse web 101 at the inlet end of the barrel. The barrel has an inwardly directed flange or lip 103 at its outlet end. This lip is adapted for latching engagement with spring latch members 105 in the cylinder 73 at the outlet end of the cylinder. A spring 107 biases the piston 97 to the retracted position shown in Figure 3 adjacent the inlet end of the cylinder. The web 101 has a bleed hole 109, and ports 111. A flap valve member 113 covers the ends of the ports 111 at the inlet side of the web 101. The piston has a plunger 115 extending axially from the web 101 toward the outlet end of the cylinder 73. This plunger is of such diameter as to be adapted for a sliding sealing fit in packing ring 85. Its length is such that when the piston is in a retracted position shown in solid lines in Figure 3, the end of the plunger is withdrawn from the passage 81.

Operation of the embodiment shown in Figure 3 is as follows:

The piston 97 normally occupies the retracted position shown in solid lines in Figure 3. It will be understood that the cylinder 73 will normally be filled with brake fluid. Upon operation of the brakes, fluid under pressure is supplied through inlet 79. This results in transmission of pressure through passages 81 and 87 to operate the brake cylinder. The pressure is equalized on opposite sides of the piston 97 via the bleed hole.

In the event of a leak in the line leading from the passage 87, with consequent reduction of pressure in the cylinder 73 on the right side of the piston 97, pressure on the left side of the piston drives it to the right to the operative position shown in dotted lines in Figure 3. The bleed hole 109 is small enough so that equalization of pressure on opposite sides of the piston cannot occur immediately. The piston 97 becomes latched in the stated operative position by the engagement of the lip 103 with spring latch members 105. Upon the stated movement of the piston, the plunger 105 enters the passage 81 and blocks it. Accordingly, fluid is prevented from escaping through the brake line so that the remainder of the vehicle brakes remain operative. After repairs have been made, the cap 91 is removed, and the rod 89 pushed inward to release the piston from the latch members. Then the cap is replaced.

Figure 4 shows a valve generally designated 121 for connection in a brake line for the same purpose as the Figure 3 construction. As illustrated, the valve 121 comprises a cylinder 123 having a head 125 threaded on one end of the cylinder and an integral head 127 at its other end. The head 127 has an integral axial extension 129. An axial passage 131 is provided in the head 127 and its extension 129. A rod 133 (which corresponds to the rod 89 of Figure 3) is slidable in passage 131. A cap 135 (corresponding to the cap 91 of Figure 3) is threaded on the extension 129.

The cylinder 123 is shown as having a main lateral inlet port 137, and passages 139 and 141 leading in opposite directions from the main inlet port to auxiliary lateral inlet ports 143 and 145 located toward the opposite ends of the cylinder. The cylinder 123 is also shown as having a main lateral outlet port 147 in the transverse plane of the main inlet port 137, and an auxiliary outlet port 149 located toward the end of the cylinder equipped with the rod 133. The cross sectional area of the auxiliary outlet port 149 is greater than that of the auxiliary inlet ports 143 and 145.

A piston 151 is reciprocable in the cylinder 123. The width of piston 151 is less than the distance between the auxiliary inlet ports 143 and 145. The piston is normally maintained in the generally central retracted position in which it is shown in solid lines in Figure 4 between the ports 143 and 145. In this retracted position of the piston, both ports 143 and 145 are open to the cylinder, as long as pressure is equal on opposite sides of the piston. The piston is latched in this retracted position by means of a spring-biased ball 153 carried by the piston engageable in a recess 155 in the cylinder to prevent the piston from fluttering in the case of slight variations in pressure on opposite sides of the piston. Ball 153 is also engageable in a recess 157 on movement of the piston to the right from the retracted position shown in solid lines in Figure 4 to the operative position shown in dotted lines in Figure 4 for latching the piston in this operative position. The piston has an annular groove 159 which is located in the plane of the main inlet 137 and the main outlet 147 when the piston is in its retracted position.

Operation of the embodiment shown in Figure 4 is as follows:

The piston 151 normally occupies the retracted position shown in solid lines in Figure 4. It will be understood that the cylinder 123 will normally be filled with brake fluid on both sides of the piston. Upon operation of the brakes of the vehicle, fluid under pressure is supplied through the main inlet 137 and the groove 159 in the piston to the main outlet 147. Fluid under pressure is also supplied through inlets 143 and 145 to opposite sides of the piston, and through the auxiliary outlet 149 to the main outlet. The pressure of fluid being equal on opposite sides of the piston, the piston remains in retracted position.

In the event of a leak in the line leading from the outlet 147, with consequent reduction of pressure on the right side of the piston 151, pressure on the left side of the piston drives it to the right to the operative position shown in dotted lines in Figure 4 wherein it blocks off the main inlet 137 and the main outlet 147 and the auxiliary inlet 145. The piston becomes latched in the stated operative position by the engagement of ball 153 in the recess 157. Accordingly, fluid is prevented by the valve from escaping. After repairs have been completed, cap 135 is removed, and the rod 133 pushed inward to release ball 153 from recess 157 and return the piston to retracted position. Then the cap is replaced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising a cylinder having a main lateral inlet and two auxiliary inlets located toward opposite ends of the cylinder from the main inlet, a main lateral outlet, and an auxiliary outlet toward one end of the cylinder, a piston in the cylinder, said piston having a length less than the distance between the auxiliary inlets, means for releasably holding the piston in a retracted position between the auxiliary inlets wherein both auxiliary inlets are open to the cylinder on opposite ends of the piston, said piston being formed for communication from the main inlet to the main outlet when in retracted position, said piston being movable in response to development of lower pressure on its end toward the auxiliary outlet than on its other end to an operative position in which it blocks the main inlet, the main outlet and the auxiliary inlet toward said one end of the cylinder.

2. A valve as set forth in claim 1 further comprising means for latching the piston in its retracted and its operative positions.

3. A valve as set forth in claim 1 further comprising means accessible from outside the cylinder for moving the piston to release it from being latched in its operative position.

References Cited in the file of this patent

UNITED STATES PATENTS

| | | |
|---|---|---|
| 1,200,842 | Johnson | Oct. 10, 1916 |
| 1,905,077 | Walker | Apr. 25, 1933 |
| 2,024,042 | Jance | Dec. 10, 1935 |
| 2,093,015 | Madden | Sept. 14, 1937 |
| 2,127,849 | Stone | Aug. 23, 1938 |
| 2,332,301 | Cox | Oct. 19, 1943 |
| 2,566,147 | Severini | Aug. 28, 1951 |
| 2,568,311 | Wise et al. | Sept. 18, 1951 |
| 2,700,982 | Fuentes et al. | Feb. 1, 1955 |
| 2,711,186 | Perez | June 21, 1955 |
| 2,782,600 | Crown et al. | Feb. 26, 1957 |
| 2,833,117 | Wilcocks | May 6, 1958 |

FOREIGN PATENTS

| | | |
|---|---|---|
| 693,197 | France | Aug. 18, 1930 |
| 23,149 | Great Britain | Oct. 10, 1912 |